United States Patent
Anshuman et al.

(10) Patent No.: US 11,343,202 B1
(45) Date of Patent: May 24, 2022

(54) MANAGING EDGE DEVICES BASED ON PREDICTED NETWORK BANDWIDTH UTILIZATION

(71) Applicant: Dell Products L.P., Round Rock, TX (US)

(72) Inventors: Abhinav Anshuman, Bihar (IN); Abhishek Gupta, Delhi (IN); Nandini Arulmani, Tamilnadu (IN); Ravishankar Kanakapura N, Bangalore (IN); Rishi Chandra, Bihar (IN); Winston X. Fernandes, Sirsi (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/239,173

(22) Filed: Apr. 23, 2021

(51) Int. Cl.
*H04L 47/83* (2022.01)
*H04L 47/80* (2022.01)
*H04L 47/78* (2022.01)
*H04L 47/76* (2022.01)

(52) U.S. Cl.
CPC ............ *H04L 47/823* (2013.01); *H04L 47/76* (2013.01); *H04L 47/781* (2013.01); *H04L 47/805* (2013.01)

(58) Field of Classification Search
CPC ..... H04L 47/76; H04L 47/781; H04L 47/805; H04L 47/823
See application file for complete search history.

(56) References Cited

U.S. PATENT DOCUMENTS

| | | | |
|---|---|---|---|
| 2008/0080374 A1* | 4/2008 | Nuzman | H04L 47/781 370/235 |
| 2013/0024868 A1* | 1/2013 | Jeong | G06F 9/505 718/104 |
| 2013/0028268 A1* | 1/2013 | Nag | H04L 47/18 370/468 |
| 2015/0244645 A1* | 8/2015 | Lindo | H04L 47/823 709/224 |
| 2018/0176148 A1* | 6/2018 | Ku | H04L 67/22 |
| 2020/0218571 A1* | 7/2020 | Chen | G06F 9/5083 |
| 2020/0301740 A1* | 9/2020 | Gabrielson | G06F 9/451 |
| 2021/0021541 A1* | 1/2021 | Zavesky | H04L 47/823 |

* cited by examiner

*Primary Examiner* — Jeong S Park
(74) *Attorney, Agent, or Firm* — Baker Botts L.L.P.

(57) ABSTRACT

In one embodiment, a method for managing a plurality of edge devices based on a predicted network bandwidth utilization includes: identifying a plurality of management tasks associated with the plurality of edge devices, each of the plurality of management tasks associated with a priority; determining a management task of the plurality of management tasks to be assigned to an edge device of the plurality of edge devices; accessing a time series indicating the predicted network bandwidth utilization of the plurality of edge devices; generating a threshold value for the management task based on the time series, the threshold value corresponding to a percentage of the predicted network bandwidth utilization and including one or more available time slots; determining that the predicted network bandwidth utilization is less than the threshold value; and assigning the management task to the edge device.

20 Claims, 3 Drawing Sheets

MANAGING EDGE DEVICES BASED ON PREDICTED NETWORK BANDWIDTH UTILIZATION

BACKGROUND

Field of the Disclosure

The disclosure relates generally to information handling systems, and in particular to managing edge devices based on predicted network bandwidth utilization.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a method for managing a plurality of edge devices based on a predicted network bandwidth utilization includes: identifying, by a device manager of an information handling system, a plurality of management tasks associated with the plurality of edge devices, each of the plurality of management tasks associated with a priority, each of the plurality of edge devices communicably coupled to the information handling system via a network; determining, by the device manager, a management task of the plurality of management tasks to be assigned to an edge device of the plurality of edge devices; accessing, by the device manager, a time series indicating the predicted network bandwidth utilization of the plurality of edge devices; generating, by the device manager, a threshold value for the management task based on the time series, the threshold value corresponding to a percentage of the predicted network bandwidth utilization and including one or more available time slots; determining, by the device manager, that the predicted network bandwidth utilization is less than the threshold value; and in response to determining that the predicted network bandwidth utilization is less than the threshold value: assigning, by the device manager, the management task to the edge device.

In one or more of the disclosed embodiments, determining the management task to be assigned to the edge device includes: identifying, by the device manager, the priority associated with each of the plurality of management tasks; and selecting, by the device manager, the management task from the plurality of management tasks based on the priority, the management task having a highest priority.

In one or more of the disclosed embodiments, determining the management task to be assigned to the edge device includes: identifying, by the device manager, a state associated with the edge device; determining, by the device manager, that the edge device requires an update based on the state; identifying, by the device manager, an updating task from the plurality of management tasks; modifying, by the device manager, a priority associated with the updating task to include an increased priority; and selecting, by the device manager, the updating task as the management task from the plurality of management tasks based on the increased priority.

In one or more of the disclosed embodiments, determining the management task to be assigned to the edge device includes: identifying, by the device manager, a state associated with the edge device; determining, by the device manager, that the edge device requires monitoring based on the state; identifying, by the device manager, a monitoring task from the plurality of management tasks; modifying, by the device manager, a priority associated with the monitoring task to include an increased priority; and selecting, by the device manager, the monitoring task as the management task from the plurality of management tasks based on the increased priority.

In one or more of the disclosed embodiments, each of the one or more available time slots indicates an interval of time within the threshold value in which the predicted network bandwidth utilization is less than the threshold value.

In one or more of the disclosed embodiments, the management task is completed by the edge device within the one or more available time slots.

In one or more of the disclosed embodiments, the threshold value further includes one or more unavailable time slots, wherein each of the one or more unavailable time slots indicates an interval of time within the threshold value in which the predicted network bandwidth utilization is greater than the threshold value.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes a method for managing a plurality of edge devices based on a predicted network bandwidth utilization that includes: identifying, by a device manager of an information handling system, a plurality of management tasks associated with the plurality of edge devices, each of the plurality of management tasks associated with a priority, each of the plurality of edge devices communicably coupled to the information handling system via a network; determining, by the device manager, a management task of the plurality of management tasks to be assigned to an edge device of the plurality of edge devices; accessing, by the device manager, a time series indicating the predicted network bandwidth utilization of the plurality of edge devices; generating, by the device manager, a threshold value for the management task based on the time series, the threshold value corresponding to a percentage of the predicted network bandwidth utilization and including one or more available time slots; determining, by the device manager, that the predicted network bandwidth utilization is less than the threshold value; and in response to determining that the predicted network bandwidth utilization is less than the threshold value: assigning, by the device manager, the management task to the edge device.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 1:
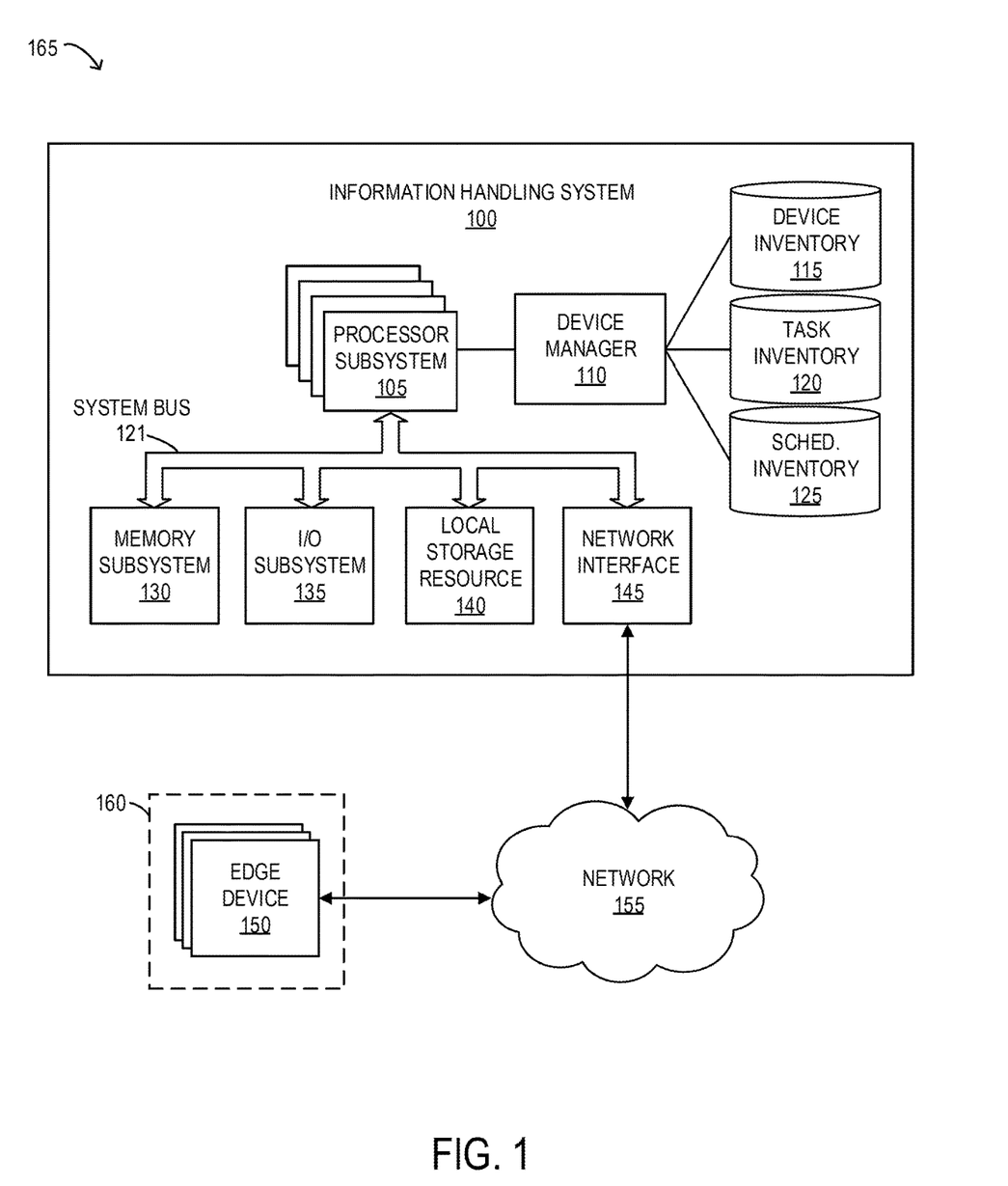
FIG. 1 is a block diagram of selected elements of an embodiment of a computing environment that includes an information handling system.
Figure 2:
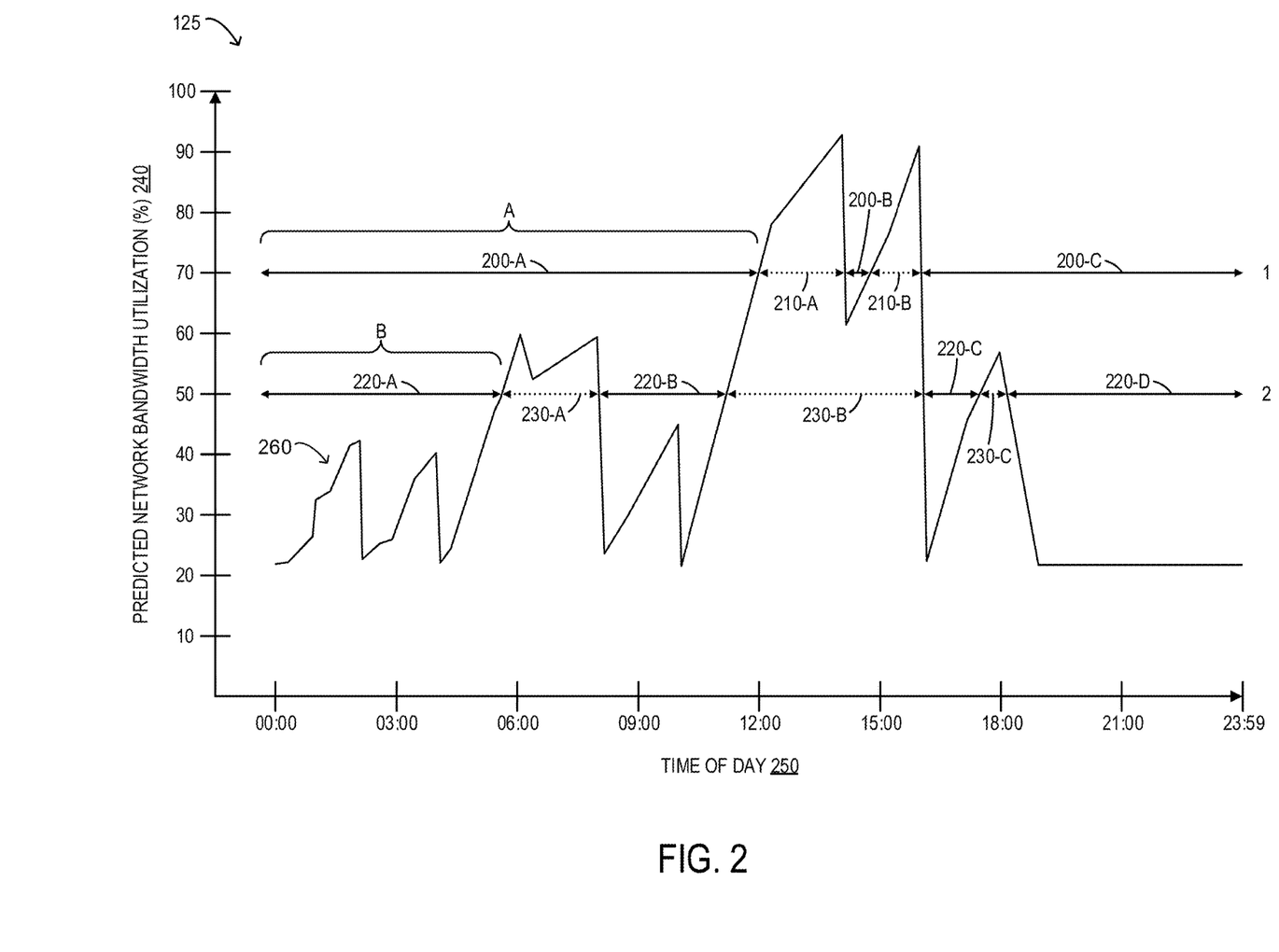
FIG. 2 is a time series graph illustrating selected elements of an embodiment of a predicted network bandwidth utilization.
Figure 3:
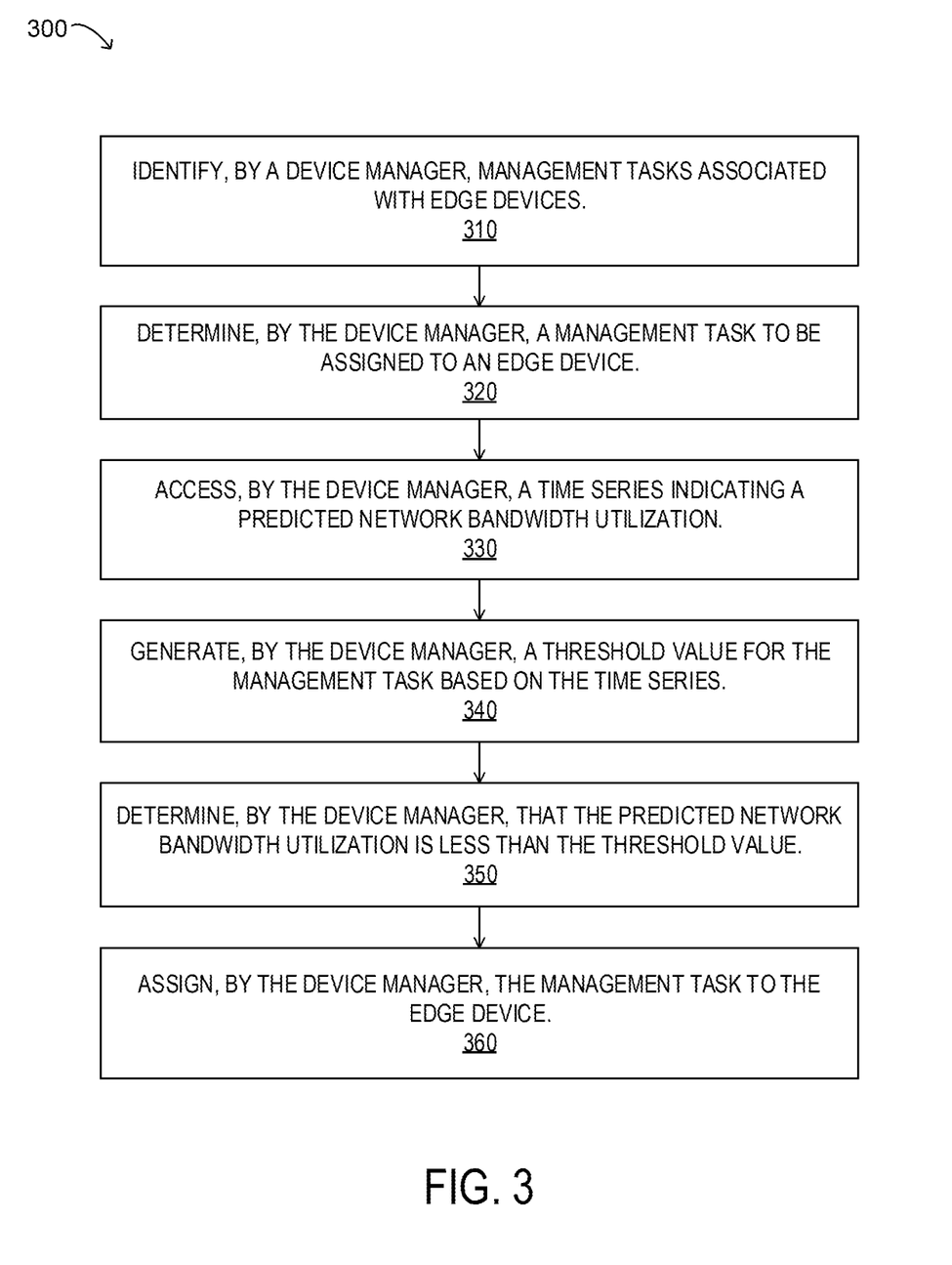
FIG. 3 is a flowchart depicting selected elements of an embodiment of a method for managing edge devices based on a predicted network bandwidth utilization.

Particular embodiments are best understood by reference to FIGS. 1-3 wherein like numbers are used to indicate like and corresponding parts.

Turning now to the drawings, FIG. 1 is a block diagram of selected elements of an embodiment of a computing environment that includes an information handling system. Specifically, FIG. 1 illustrates a block diagram depicting selected elements of an information handling system 100 in accordance with some embodiments of the present disclosure. In other embodiments, information handling system 100 may represent different types of portable information handling systems, such as, display devices, head mounted displays, head mount display systems, smart phones, tablet computers, notebook computers, media players, foldable display systems, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems.

In the embodiment illustrated in FIG. 1, components of information handling system 100 may include, but are not limited to, a processor subsystem 105, which may comprise one or more processors, and system bus 121 that communicatively couples various system components to processor subsystem 105 including, for example, a memory subsystem 130, an I/O subsystem 135, a local storage resource 140, and a network interface 145. Network interface 145 may communicably couple information handling system 100 to one or more edge devices 150 within a cluster 160 via network 155. System bus 121 may represent a variety of suitable types of bus structures (e.g., a memory bus, a peripheral bus, or a local bus) using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. As shown in FIG. 1, information handling system 100 may additionally include a device manager 110, a device inventory 115, a task inventory 120, and a scheduling inventory 125. In other embodiments, computing environment 165 may include additional, fewer, and/or different components than the components shown in FIG. 1.

In information handling system 100, processor subsystem 105 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 105 may interpret and/or execute program instructions and/or process data stored locally (e.g., in memory subsystem 130 and/or another component of information handling system 100). In the same or alternative embodiments, processor subsystem 105 may interpret and/or execute program instructions and/or process data stored remotely. In one embodiment, processor subsystem 105 may be or include a multi-core processor comprised of one or more processor cores disposed upon an integrated circuit (IC) chip. In other embodiments, processor subsystem 105 may be or include an integrated device (e.g., microcontroller, system on a chip (SoC), and the like) that includes memory, peripheral interfaces, and/or other components suitable for interpreting and/or executing program instructions and/or processing data.

In one embodiment, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In one embodiment, I/O subsystem 135 may comprise a system, device, or apparatus generally operable to receive and/or transmit data to, from, and/or within information handling system 100. I/O subsystem 135 may represent, for example, a variety of communication interfaces, graphics interfaces, video interfaces, user input interfaces, and/or peripheral interfaces. In various embodiments, I/O subsystem 135 may be used to support various peripheral devices, such as a touch panel, a display adapter, a keyboard, an accelerometer, a touch pad, a gyroscope, an IR sensor, a microphone, a sensor, a camera, or another type of peripheral device.

In one embodiment, local storage resource 140 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data.

In one embodiment, network interface 145 may be a suitable system, apparatus, or device operable to serve as an interface between information handling system 100 and a network 155. Network interface 145 may enable information handling system 100 to communicate over network 155 using a suitable transmission protocol and/or standard, including, but not limited to, transmission protocols and/or standards enumerated below with respect to the discussion of network 155. Network 155 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 145 may enable wired and/or wireless communications (e.g., NFC or Bluetooth) to and/or from information handling system 100.

In particular embodiments, network 155 may include one or more routers for routing data between client information handling systems 100 and server information handling systems 100. A device (e.g., a client information handling system 100 or a server information handling system 100) on network 155 may be addressed by a corresponding network address including, for example, an Internet protocol (IP) address, an Internet name, a Windows Internet name service (WINS) name, a domain name or other system name. In particular embodiments, network 155 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

In one embodiment, network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof.

In computing environment 165, each edge device 150 (collectively referred to herein as "edge devices 150") may comprise a system, device, or apparatus operable to manage, and/or provide connectivity to, one or more devices. In particular, each edge device 150 may be communicably coupled to one or more devices (not shown in FIG. 1) deployed throughout computing environment 165. In one embodiment, edge devices 150 may manage data flow between two or more networks. In this embodiment, edge devices 150 may additionally provide a general-purpose gateway to translate one type of network protocol (e.g., protocol for network 155) into a type of network protocol used by one or more external networks. For example, edge device 150 may be or include a router that provides information handling system 100 with a network entry point into enterprise and/or service provider core networks. In another embodiment, edge device 150 may manage one or more Internet of Things (IoT) devices deployed throughout an external network. For example, edge device 150 may be or include a central controller used to connect a variety of IoT devices within an external network that enables bi-directional communication between and/or amongst the IoT devices within the network. In one embodiment, edge device 150 may be or include one or more routers. In other embodiments, edge device 150 may be or include one or more routing switches, integrated access devices (IADs), multiplexers, metropolitan area network (MAN) access devices, wide area network (WAN) access devices, edge concentrator devices, and/or any system, device, or apparatus suitable for managing, and/or providing connectivity to, one or more devices.

As shown in FIG. 1, edge devices 150 communicably coupled to information handling system 100 via network 155 may comprise a cluster 160. Each edge device 150 within cluster 160 may utilize a respective portion of network bandwidth allocated for cluster 160. In one embodiment, network bandwidth may be distributed, or otherwise utilized, evenly across each edge device 150 within cluster 160. That is, each edge device 150 within cluster 160 may utilize the same, or approximately the same, network bandwidth with respect to one another. In this embodiment, device manager 110 may monitor the network bandwidth utilization within cluster 160 and may collect network analytics based on overall network bandwidth utilization for cluster 160. In another embodiment, network bandwidth may be distributed, or otherwise utilized, unevenly across edge devices 150 within cluster 160. For example, a given edge device 150 within cluster 160 may be experiencing failures or issues due to worn or inoperable hardware causing an underutilization, or overutilization, of network bandwidth allocated for cluster 160. In another example, a given edge device 150 within cluster 160 may require an operating system (OS) and/or firmware update that causes an underutilization, or overutilization, of network bandwidth allocated for cluster 160. In this embodiment, device manager 110 may monitor the network bandwidth utilization for each respective edge device 150 within cluster 160 and may collect network analytics granularly based on individual edge device 150 network bandwidth utilization. It is noted that although a single cluster 160 of edge devices 150 is shown in the embodiment illustrated in FIG. 1, other embodiments may include any number of clusters 160 suitable for managing, and/or providing connectivity to, one or more devices. Edge devices are described in further detail with respect to FIG. 2.

In information handling system 100, device inventory 115 may comprise a system, device, or apparatus operable to store information describing one or more edge devices 150 within computing environment 165. In particular, device inventory 115 may be or include a repository used to store information describing various properties (e.g., device type, manufacturer, device description, and the like) of edge devices 150 communicably coupled to information handling system 100 (e.g., via network 155). For example, device inventory 115 may store information describing a device health associated with each edge device 150 within computing environment 165. In another example, device inventory 115 may store information describing an average network bandwidth utilization associated with each edge device 150 within computing environment 165. In one embodiment, device inventory 115 may store a list indicating one or more edge devices 150 within cluster 160. In this embodiment, device inventory 115 may store multiple lists that each correspond to a respective cluster 160 within computing environment 165 such that device manager 110 may access each list to identify edge devices 150 comprising respective clusters 160.

In one embodiment, information stored in device inventory 115 may indicate an operational status, or state, of each edge device 150. In particular, information stored in device inventory 115 may indicate a state associated with each edge device 150 in computing environment 165. For example, device inventory 115 may store information that indicates driver details, OS version, firmware version, and/or device health for each edge device 150 in computing environment 165. In one embodiment, device inventory 115 may additionally store historical data describing one or more edge devices 150 within computing environment 165. In this embodiment, device manager 110 may access the historical data to serve as input into a trained artificial intelligence (AI) and/or machine learning (ML) model used to manage edge devices 150 (e.g., based on predicted network bandwidth utilization). In one embodiment, device inventory 115 may be or include a relational database in which edge device 150 descriptions and associated properties are stored as entries within a list. In other embodiments, device inventory 115 may be or include a centralized database, distributed database, commercial database, operational database, and/or any other database management system suitable for storing information describing one or more edge devices 150 within computing environment 165. Device inventory 115 is described in further detail with respect to FIG. 2.

In one embodiment, task inventory 120 may comprise a system, device, or apparatus operable to store information describing one or more management tasks associated with edge devices 150 within computing environment 165. Specifically, task inventory 120 may be or include a repository used to store information describing various management tasks to be assigned to edge devices 150 communicably coupled to information handling system 100 (e.g., via network 155). For example, task inventory 120 may store information describing respective functions of various management tasks, average network bandwidth utilization for various management tasks, average execution time (i.e., time duration to complete) for various management tasks, and the like. In one embodiment, task inventory 120 may store information describing a management task used to update, or an "updating task," an operational status, or state, of edge devices 150. For example, updating tasks stored in task inventory 120 may be or include management tasks used to update security settings, firmware versions, OS versions, permissions settings, and/or various system settings for edge devices 150 within computing environment 165. In another embodiment, task inventory 120 may store information describing a management task used to monitor, or a "monitoring task," a device health of edge devices 150. For example, monitoring tasks stored in task inventory 120 may be or include management tasks used to collect an inventory for edge devices 150 (i.e., device temperature, fan speed, firmware version, OS version, software versions, and the like), average network bandwidth utilization, and/or any other static and/or dynamic attributes or settings associated with edge devices 150. In yet another embodiment, task inventory 120 may store information describing a management task used to process, or "processing tasks," events associated with edge devices 150. For example, processing tasks stored in task inventory 120 may be or include management tasks used to track and/or analyze streams of data or metadata associated with the addition of an edge device 150 to an existing cluster 160, the removal of an edge device 150 from an existing cluster 160, the addition of one or more additional clusters 160 into computing environment 165, the addition and/or removal of one or more devices managed by edge devices 150 and/or any other events associated with edge devices 150.

Each management task stored in task inventory 120 may be associated with a priority. In one embodiment, the priority associated with respective management tasks may be based on a frequency in which data is changed, or otherwise modified, for edge devices 150. Here, a management task that involves dynamic data that changes frequently, and/or in real-time, may be assigned a higher priority than a management task that involves static data that changes infrequently. For example, a monitoring task used for shallow inventory collection for an edge device 150 that monitors sensor data, device temperature, fan speed, and/or other dynamic attributes associated with the edge device 150 may be assigned a high priority. In contrast, a monitoring task used for deep inventory collection for an edge device 150 that monitors a complete inventory of components and/or static attributes associated with the edge device 150 may be assigned a low priority. In another embodiment, the priority associated with respective management tasks may be based on a criticality, and/or urgency, in which the management tasks must be completed. In this embodiment, critical management tasks that require urgent assignment to edge devices 150 may be assigned a higher priority than noncritical management tasks. For example, an updating task used to update security settings, firmware versions, software versions, OS versions, permissions settings, and/or various system settings required by device manager 110 for communication with edge devices 150 may be assigned a high priority. Conversely, as described in the example above, a monitoring task used for deep inventory collection for an edge device 150 that monitors a complete inventory of components and/or static attributes associated with the edge device 150 may be assigned a low priority. In one embodiment, task inventory 120 may be or include a relational database in which management task descriptions and associated attributes (e.g., executables, functions, header files, and the like) are stored as entries within a list. In other embodiments, task inventory 120 may be or include a centralized database, distributed database, commercial database, operational database, and/or any other database management system suitable for storing information describing one or more management tasks associated with edge devices 150 within computing environment 165. Task inventory 120 is described in further detail with respect to FIG. 2.

In one embodiment, scheduling inventory 125 may comprise a system, device, or apparatus operable to store information describing a predicted network bandwidth utilization associated with edge devices 150 within computing environment 165. In particular, scheduling inventory 125 may be or include a repository used to store information describing a predicted network bandwidth utilization for edge devices 150, and/or clusters 160 of edge devices 150, communicably coupled to information handling system 100 (e.g., via network 155). For example, scheduling inventory 125 may store information describing a predicted percentage of allocated network bandwidth utilization for a cluster 160 of edge devices 150 within a certain geographic area or region. In another example, scheduling inventory 125 may store information describing a predicted percentage of allocated network bandwidth utilization for one or more edge devices 150 within a cluster 160. In one embodiment, the information describing the predicted network bandwidth utilization associated with edge devices 150 may be stored as one or more time series entries. That is, scheduling inventory 125 may store a series of data points that are indexed, listed, and/or graphed in time order to form a time series indicating a predicted network bandwidth utilization for edge devices 150 with respect to a given time interval (e.g., a day, month, year, and the like). In one embodiment, the time series stored in scheduling inventory 125 may be based on historical data associated with previous network bandwidth utilization for edge devices 150, and/or clusters 160 of edge devices 150, communicably coupled to information handling system 100. For example, device manager 110 may monitor edge devices 150 within a certain geographic area or region to identify a network bandwidth utilization for the edge devices 150 during intervals of one month throughout the span of one year. Here, device manager 110 may use this historical data as input into a trained AI and/or machine learning (ML) model to generate a predicted network bandwidth utilization time series (e.g., time series 260 shown in FIG. 2). In one embodiment, scheduling inventory 125 may be or include a relational database in which predicted network bandwidth utilization data for respective time intervals (e.g., day, month, year, and the like) are stored as entries within a list. In other embodiments, scheduling inventory 125 may be or include a centralized database, distributed database, commercial database, operational database, and/or any other database management system suitable for storing information describing a predicted network bandwidth utilization associated with edge devices 150 within computing environment 165. Scheduling inventory 125 is described in further detail with respect to FIG. 2.

In one embodiment, device manager 110 may comprise a system, device, or apparatus operable to manage edge devices 150 for information handling system 100. In particular, device manager 110 may assign, or otherwise delegate, one or more management tasks to edge devices 150 communicably coupled to information handling system 100 in accordance with an optimal network bandwidth utilization (e.g., based on predicted network bandwidth utilization). That is, device manager 110 may allow, or may not allow, one or more management tasks (e.g., requested and/or assigned by a device, service, and/or administrator of computing environment 165) to be performed by edge devices 150 according to an optimal network bandwidth utilization. Conventionally, device managers may not account for immediate impacts on network bandwidth utilization when assigning management tasks to edge devices within a computing environment having a finite network bandwidth. As such, this finite network bandwidth may be exceeded while one or more edge devices perform the management tasks assigned by device managers, resulting in postponed completion of, and/or incomplete, management tasks that may be critical for lifecycle management of the edge devices. Further, for instances in which edge devices are located in remote areas or rough terrain where information technology (IT) staff and/or administrators may not physically access the edge devices, such finite bandwidth limitations may be compounded by locational and/or operational constraints that further hinder lifecycle management of the edge devices. In contrast, device manager 110 may manage edge devices 150 within a computing environment 165 based on a predicted network bandwidth utilization. Using the predicted network bandwidth utilization (e.g., stored in scheduling inventory 125), device manager 110 may assign one or more management tasks to edge devices 150 in accordance with an optimal network utilization such that finite network bandwidth may not be exceeded while edge devices 150 perform and complete the management tasks. In this way, device manager 110 ensures a successful completion of management tasks that may be critical for lifecycle management of edge devices 150.

To manage edge devices 150, device manager 110 may first identify the management tasks associated with edge devices 150. In particular, device manager 110 may access task inventory 120 to identify the management tasks to be assigned to edge devices 150. In one embodiment, task inventory 120 may be or include a relational database in which management task descriptions and associated attributes (e.g., executables, functions, header files, and the like) are stored as entries within a list. In this embodiment, device manager 110 may identify each management task stored in task inventory 120 based on the management task descriptions and associated attributes. For example, device manager 110 may identify respective functions of various management tasks, average network bandwidth utilization for various management tasks, average execution time (i.e., time duration to complete) for various management tasks, and the like. In other embodiments, task inventory 120 may be or include a centralized database, distributed database, commercial database, operational database, and/or any other database management system accessible to device manager 110 within information handling system 100.

In one embodiment, device manager 110 may determine a management task, or management tasks, to be assigned to edge device 150, or edge devices 150, from the management tasks associated with edge devices 150. In particular, device manager 110 may select a management task, or management tasks, from the available management tasks stored in task inventory 120. As described above, each management task stored in task inventory 120 may be associated with a priority. Device manager 110 may use the priority associated with each management task to determine a management task to be assigned to edge device 150, or edge devices 150. For example, device manager 110 may identify the priority associated with each of the management tasks stored in task inventory 120 and may select the management task, or management tasks, having a highest priority.

In one embodiment, device manager 110 may determine a management task, or management tasks, to be assigned to edge device 150, or edge devices 150, based on a state associated with edge device 150, or edge devices 150. For example, device manager 110 may access device inventory 115 to identify a state of each edge device 150 in computing environment 165 and may identify one or more edge devices 150 that require updating tasks to update security settings, firmware versions, OS versions, permissions settings, and/or various system settings required by device manager 110 for communication with edge devices 150. Because these updating tasks may be deemed critical (i.e., requiring urgent assignment to edge devices 150), device manager 110 may modify the priority associated with an updating task, or updating tasks, to increase the priority to a higher priority than noncritical management tasks stored in task inventory 120. Here, device manager 110 may select the updating task, or updating tasks, based on the increased priority accordingly. Similarly, in another example, device manager 110 may access device inventory 115 to identify the state of each edge device 150 and may identify one or more failing edge devices 150 that require monitoring tasks to monitor device health for the edge devices 150. Because these monitoring tasks may be deemed critical, device manager 110 modify the priority associated with a monitoring task, or monitoring tasks, to increase the priority to a higher priority than noncritical management tasks stored in task inventory 120. Device manager 110 may select the monitoring task, or monitoring tasks, based on the increased priority accordingly.

In one embodiment, device manager 110 may access a time series stored in scheduling inventory 125 to identify a predicted network bandwidth utilization for edge devices 150 during a given interval of time and may generate a limit, or "threshold value," that corresponds to a certain percentage of the predicted network bandwidth utilization. In one embodiment, a threshold value may be or include a numeric value (e.g., ranging between 0 and 100) that indicates a certain percentage of the predicted network bandwidth utilization at which one or more management tasks may be assigned by device manager 110. That is, device manager 110 may generate respective threshold values for one or more management tasks. As described above, each management task may be associated with a priority. In one embodiment, each respective threshold value generated by device manager 110 may be a function of the priority associated with a management task and an average network bandwidth utilization. Here, threshold value may be calculated by device manager 110 such that management tasks having a higher priority than other management tasks may be accommodated, or allowed to complete more efficiently, within the average network bandwidth utilization. For example, if an updating task (i.e., having a high priority of 1) used to update security settings for edge devices 150 and a monitoring task (i.e., having a lower priority of 3) used to collect an inventory for edge devices 150 are both to be performed, but allowing both to be performed would exceed the threshold value or network bandwidth, device manager 110 may allow the management task having a higher priority to be performed. In this example, the updating task may be performed given that the updating task has a higher priority than the monitoring task. In another embodiment, device manager 110 may generate a threshold value based on an average network bandwidth utilization for a given management task. For example, device manager 110 may access task inventory 120 to identify an average network bandwidth utilization for various management tasks as described above. In another embodiment, device manager 110 may generate a threshold value based on an average execution time for a given management task. For example, device manager 110 may access task inventory 120 to identify an average execution time (i.e., time duration to complete) for various management tasks as described above. In other embodiments, device manager 110 may generate a threshold value based on a priority, an average network bandwidth utilization, an average execution time for a given management task, and/or any combination of management task attributes suitable for generating threshold values.

Device manager 110 may use threshold values, in part, to assign one or more management tasks to edge device 150, or edge devices 150 within cluster 160. Specifically, if the predicted network bandwidth utilization for edge devices 150 during a given time interval, or an "available time slot," is less than the generated threshold value, device manager 110 may assign the one or more management tasks to edge device 150, or edge devices 150, associated with the generated threshold value. In one embodiment, the one or more management tasks may be assigned to edge device 150, or edge devices 150, during the available time slot, or available time slots, such that the one or more management tasks may be completed by edge device 150, or edge devices 150, without interrupts due to exceeded network bandwidth. In another embodiment, the one or more management tasks may be assigned to edge device 150, or edge devices 150, over multiple available time slots. Here, the one or more management tasks may be divided into respective portions that that may be completed by edge device 150, or edge devices 150, over multiple available time slots despite interrupts due to exceeded network bandwidth. In contrast, if the predicted network bandwidth utilization for edge devices 150 during a given time interval, or an "unavailable time slot," is greater than the generated threshold value, device manager 110 may refrain from assigning one or more management tasks to edge device 150, or edge devices 150, associated with the generated threshold value to avoid interrupts due to exceeded network bandwidth.

FIG. 2 is a time series graph illustrating selected elements of an embodiment of a predicted network bandwidth utilization. In particular, FIG. 2 illustrates an example representation of a time series 260 stored in scheduling inventory 125 that pertains to a given day (i.e., comprised of 24 hours). In the embodiment illustrated in FIG. 2, time series 260 may be or include a series of data points graphed in time order (i.e., from 00:00 to 23:59 hours) indicating a predicted network bandwidth utilization 240 for edge devices 150 with respect to a time of day 250. In one embodiment, time series 260 stored in scheduling inventory 125 may be based on historical data associated with previous network bandwidth utilization for edge devices 150, and/or clusters 160 of edge devices 150, communicably coupled to information handling system 100. For example, device manager 110 may monitor edge devices 150 within a certain geographic area or region to identify a network bandwidth utilization for the edge devices 150 during intervals of one month throughout the span of one year. Device manager 110 may use this historical data as input into a trained AI and/or machine learning (ML) model to generate time series 260.

In the time series graph illustrated in FIG. 2, a predicted network bandwidth utilization 240 of 0% may indicate that network 155 (shown in FIG. 1) is not being utilized by device manager 110 and/or edge devices 150. In contrast, a predicted network bandwidth utilization 240 of 100% may indicate that network 155 is being fully utilized by device manager 110 and/or edge devices 150. In one embodiment, device manager 110 and/or edge devices 150 may limit network bandwidth utilization to no more than 70% to avoid potential loss of communication and/or transmission failures associated with an increased utilization of network 155. In the embodiment illustrated in FIG. 2, device manager 110 may generate a first threshold, "threshold 1," having a numeric value of 70 that corresponds to a predicted network bandwidth utilization 240 of 70%. Similarly, device manager 110 may generate a second threshold, "threshold 2," having a numeric value of 50 that corresponds to a predicted network bandwidth utilization 240 of 50%. Threshold 1 includes available time slots 200-A through 200-C and unavailable time slots 210-A and 210-B. Threshold 2 includes available time slots 220-A through 220-D and unavailable time slots 230-A through 230-C.

As shown in FIG. 2, predicted network bandwidth utilization 240 may be less than threshold 2 (i.e., as indicated by time series 260) during available time slots 220-A, 220-B, 220-C, and 220-D. In one embodiment, device manager 110 may assign one or more management tasks to edge device 150, or edge devices 150, to be performed, or otherwise executed, during available time slots 220-A, 220-B, 220-C, and 220-D to ensure that the one or more management tasks may be completed by edge device 150, or edge devices 150, without interrupts due to exceeded network bandwidth (i.e., during unavailable time slots 230-A, 230-B, and 230-C). In another embodiment, the one or more management tasks may be divided into respective portions across available time slots 220-A, 220-B, 220-C, and 220-D such that the one or more management tasks may be completed by edge device 150, or edge devices 150, despite interrupts due to exceeded network bandwidth. In one embodiment, device manager 110 may assign one or more management tasks having a low priority to edge device 150, or edge devices 150, at threshold 2 given that time interval B of threshold 2 may span only roughly 6 hours (i.e., 00:00 to 06:00 time of day 250), thereby providing a smaller time interval to complete the one or more management tasks than time interval A associated with available time slot 200-A of threshold 1. For example, device manager 110 may assign a first low priority management task to edge devices 150 at threshold 2 that includes an average execution time of roughly 6 hours (e.g., as indicated by information stored in task inventory 120) to ensure a successful completion of the low priority management task. In another embodiment, device manager 110 may assign one or more management tasks having a high and/or low priority to edge device 150, or edge devices 150, at threshold 2 given that threshold 2 utilizes only 50% of the predicted network bandwidth utilization 240, thereby ensuring that the potential loss of communication and/or transmission failures associated with an increased utilization of network 155 is avoided.

In the embodiment illustrated in FIG. 2, predicted network bandwidth utilization 240 may be less than threshold 1 (i.e., as indicated by time series 260) during available time slots 200-A, 200-B, and 200-C. In one embodiment, device manager 110 may assign one or more management tasks to edge device 150, or edge devices 150, to be performed, or otherwise executed, during available time slots 200-A, 200-B, and 200-C to ensure that the one or more management tasks may be completed by edge device 150, or edge devices 150, without interrupts due to exceeded network bandwidth (i.e., during unavailable time slots 210-A and 210-B). In another embodiment, the one or more management tasks may be divided into respective portions across available time slots 200-A, 200-B, and 220-C such that the one or more management tasks may be completed by edge device 150, or edge devices 150, despite interrupts due to exceeded network bandwidth. In one embodiment, device manager 110 may assign one or more management tasks having a high priority to edge device 150, or edge devices 150, at threshold 1 given that time interval A of threshold 1 may span roughly 12 hours (i.e., 00:00 to 12:00 time of day 250), thereby providing a larger time interval to complete the one or more management tasks than time interval B associated with available time slot 220-A of threshold 2. For example, device manager 110 may assign a first high priority management task to edge devices 150 at threshold 1 that includes an average execution time of roughly 12 hours (e.g., as indicated by information stored in task inventory 120) to ensure a successful completion of the low priority management task. In another embodiment, device manager 110 may assign multiple high priority management tasks to edge device 150, or edge devices 150, during available time slot 200-A to be performed, or otherwise executed, in series such that the multiple high priority management tasks may be completed within time interval A.

FIG. 3 is a flowchart depicting selected elements of an embodiment of a method for managing edge devices based on a predicted network bandwidth utilization. It is noted that certain operations described in method 300 may be optional or may be rearranged in different embodiments.

Method 300 may begin at step 310, where a device manager may identify management tasks associated with edge devices. Each of the management tasks may be associated with a priority and each of the edge devices may be communicably coupled to the information handling system via a network. For example, device manager 110 may access task inventory 120 to identify management tasks used to update edge devices 150 (i.e., update tasks), monitor edge devices 150 (i.e., monitoring tasks), and/or process events associated with edge devices 150 (i.e., processing tasks) where each management task stored in task inventory 120 may be associated with a priority as described above with respect to FIG. 1. In step 320, the device manager may determine a management task to be assigned to an edge device. For example, device manager 110 may identify the priority associated with each of the management tasks stored in task inventory 120 and may select the management task, or management tasks, having a highest priority as described above with respect to FIG. 1. In steps 330 and 340, the device manager may access a time series indicating a predicted network bandwidth utilization of the edge devices and may generate a threshold value for the management task based on the time series, respectively. The threshold value may correspond to a percentage of the predicted network bandwidth utilization and may include one or more available time slots. For example, device manager 110 may access a time series stored in scheduling inventory 125 to identify a predicted network bandwidth utilization for edge devices 150 during a given interval of time and may generate a threshold value that corresponds to a certain percentage of the predicted network bandwidth utilization as described above with respect to FIG. 1. The threshold value may be or include a numeric value (e.g., ranging between 0 and 100) that indicates a certain percentage of the predicted network bandwidth utilization at which one or more management tasks may be assigned by device manager 110. In steps 350 and 360, the device manager may determine that the predicted network bandwidth utilization is less than the threshold value and may assign the management task to the edge device, respectively. For example, if the predicted network bandwidth utilization for edge devices 150 during a given available time slot is less than the generated threshold value, device manager 110 may assign one or more management tasks to edge device 150, or edge devices 150, associated with the generated threshold value as described above with respect to FIG. 1.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for managing a plurality of edge devices based on a predicted network bandwidth utilization, the method comprising:
   identifying, by a device manager of an information handling system, a plurality of management tasks associated with the plurality of edge devices, each of the plurality of management tasks associated with a priority, each of the plurality of edge devices communicably coupled to the information handling system via a network;
   determining, by the device manager, a management task of the plurality of management tasks to be assigned to an edge device of the plurality of edge devices;
   accessing, by the device manager, a time series indicating the predicted network bandwidth utilization of the plurality of edge devices;
   generating, by the device manager, a threshold value for the management task based on the time series, the threshold value corresponding to a percentage of the predicted network bandwidth utilization and including one or more available time slots;
   determining, by the device manager, that the predicted network bandwidth utilization is less than the threshold value; and
   in response to determining that the predicted network bandwidth utilization is less than the threshold value:
      assigning, by the device manager, the management task to the edge device.

2. The method of claim 1, wherein determining the management task to be assigned to the edge device comprises:
   identifying, by the device manager, the priority associated with each of the plurality of management tasks; and
   selecting, by the device manager, the management task from the plurality of management tasks based on the priority, the management task having a highest priority.

3. The method of claim 1, wherein determining the management task to be assigned to the edge device comprises:
   identifying, by the device manager, a state associated with the edge device;
   determining, by the device manager, that the edge device requires an update based on the state;
   identifying, by the device manager, an updating task from the plurality of management tasks;
   modifying, by the device manager, a priority associated with the updating task to include an increased priority; and
   selecting, by the device manager, the updating task as the management task from the plurality of management tasks based on the increased priority.

4. The method of claim 1, wherein determining the management task to be assigned to the edge device comprises:
   identifying, by the device manager, a state associated with the edge device;
   determining, by the device manager, that the edge device requires monitoring based on the state;
   identifying, by the device manager, a monitoring task from the plurality of management tasks;
   modifying, by the device manager, a priority associated with the monitoring task to include an increased priority; and
   selecting, by the device manager, the monitoring task as the management task from the plurality of management tasks based on the increased priority.

5. The method of claim 1, wherein each of the one or more available time slots indicates an interval of time within the threshold value in which the predicted network bandwidth utilization is less than the threshold value.

6. The method of claim 5, wherein the management task is completed by the edge device within the one or more available time slots.

7. The method of claim 1, wherein the threshold value further includes one or more unavailable time slots, wherein each of the one or more unavailable time slots indicates an interval of time within the threshold value in which the predicted network bandwidth utilization is greater than the threshold value.

8. One or more computer-readable non-transitory storage media embodying software that is operable when executed to:
   identify, by a device manager of an information handling system, a plurality of management tasks associated with a plurality of edge devices, each of the plurality of management tasks associated with a priority, each of the plurality of edge devices communicably coupled to the information handling system via a network;

determine, by the device manager, a management task of the plurality of management tasks to be assigned to an edge device of the plurality of edge devices;

access, by the device manager, a time series indicating a predicted network bandwidth utilization of the plurality of edge devices;

generate, by the device manager, a threshold value for the management task based on the time series, the threshold value corresponding to a percentage of the predicted network bandwidth utilization and including one or more available time slots;

determine, by the device manager, that the predicted network bandwidth utilization is less than the threshold value; and in response to determining that the predicted network bandwidth utilization is less than the threshold value:
assign, by the device manager, the management task to the edge device.

9. The media of claim 8, wherein to determine the management task to be assigned to the edge device, the software is further operable when executed to:
identify, by the device manager, the priority associated with each of the plurality of management tasks; and
select, by the device manager, the management task from the plurality of management tasks based on the priority, the management task having a highest priority.

10. The media of claim 8, wherein to determine the management task to be assigned to the edge device, the software is further operable when executed to:
identify, by the device manager, a state associated with the edge device;
determine, by the device manager, that the edge device requires an update based on the state;
identify, by the device manager, an updating task from the plurality of management tasks;
modify, by the device manager, a priority associated with the updating task to include an increased priority; and
select, by the device manager, the updating task as the management task from the plurality of management tasks based on the increased priority.

11. The media of claim 8, wherein to determine the management task to be assigned to the edge device, the software is further operable when executed to:
identify, by the device manager, a state associated with the edge device;
determine, by the device manager, that the edge device requires monitoring based on the state;
identify, by the device manager, a monitoring task from the plurality of management tasks;
modify, by the device manager, a priority associated with the monitoring task to include an increased priority; and
select, by the device manager, the monitoring task as the management task from the plurality of management tasks based on the increased priority.

12. The media of claim 8, wherein each of the one or more available time slots indicates an interval of time within the threshold value in which the predicted network bandwidth utilization is less than the threshold value.

13. The media of claim 12, wherein the management task is completed by the edge device within the one or more available time slots.

14. The media of claim 8, wherein the threshold value further includes one or more unavailable time slots, wherein each of the one or more unavailable time slots indicates an interval of time within the threshold value in which the predicted network bandwidth utilization is greater than the threshold value.

15. A computing environment, comprising:
an information handling system including one or more processors; and
one or more computer-readable non-transitory storage media coupled to one or more of the processors and comprising instructions operable when executed by one or more of the processors to cause the system to:
identify, by a device manager of the information handling system, a plurality of management tasks associated with a plurality of edge devices, each of the plurality of management tasks associated with a priority, each of the plurality of edge devices communicably coupled to the information handling system via a network;
determine, by the device manager, a management task of the plurality of management tasks to be assigned to an edge device of the plurality of edge devices;
access, by the device manager, a time series indicating a predicted network bandwidth utilization of the plurality of edge devices;
generate, by the device manager, a threshold value for the management task based on the time series, the threshold value corresponding to a percentage of the predicted network bandwidth utilization and including one or more available time slots;
determine, by the device manager, that the predicted network bandwidth utilization is less than the threshold value; and
in response to determining that the predicted network bandwidth utilization is less than the threshold value:
assign, by the device manager, the management task to the edge device.

16. The computing environment of claim 15, wherein to determine the management task to be assigned to the edge device, the processors are further operable when executed to:
identify, by the device manager, the priority associated with each of the plurality of management tasks; and
select, by the device manager, the management task from the plurality of management tasks based on the priority, the management task having a highest priority.

17. The computing environment of claim 15, wherein to determine the management task to be assigned to the edge device, the processors are further operable when executed to:
identify, by the device manager, a state associated with the edge device;
determine, by the device manager, that the edge device requires an update based on the state;
identify, by the device manager, an updating task from the plurality of management tasks;
modify, by the device manager, a priority associated with the updating task to include an increased priority; and
select, by the device manager, the updating task as the management task from the plurality of management tasks based on the increased priority.

18. The computing environment of claim 15, wherein to determine the management task to be assigned to the edge device, the processors are further operable when executed to:
identify, by the device manager, a state associated with the edge device;
determine, by the device manager, that the edge device requires monitoring based on the state;

identify, by the device manager, a monitoring task from the plurality of management tasks;

modify, by the device manager, a priority associated with the monitoring task to include an increased priority; and select, by the device manager, the monitoring task as the management task from the plurality of management tasks based on the increased priority.

19. The computing environment of claim 15, wherein each of the one or more available time slots indicates an interval of time within the threshold value in which the predicted network bandwidth utilization is less than the threshold value.

20. The computing environment of claim 19, wherein the management task is completed by the edge device within the one or more available time slots.

\* \* \* \* \*